US012747846B2

(12) United States Patent
David et al.

(10) Patent No.: US 12,747,846 B2
(45) Date of Patent: Sep. 29, 2026

(54) LIGHT COLLECTION SYSTEM FOR AN LED ARRAY

(71) Applicant: ROBE lighting s.r.o., Roznov pod Radhostem (CZ)

(72) Inventors: Tomas David, Podoli (CZ); Jan Vilem, Valasske Mezirici (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 19/397,337

(22) Filed: Nov. 21, 2025

(65) Prior Publication Data

US 2026/0078888 A1 Mar. 19, 2026

(51) Int. Cl.

| | |
|---|---|
| ***F21V 5/00*** | (2018.01) |
| ***F21V 5/04*** | (2006.01) |
| *F21Y 105/10* | (2016.01) |
| *F21Y 113/13* | (2016.01) |
| *F21Y 115/10* | (2016.01) |

(52) U.S. Cl.

CPC .............. *F21V 5/008* (2013.01); *F21V 5/003* (2013.01); *F21V 5/007* (2013.01); *F21V 5/043* (2013.01); *F21V 5/048* (2013.01); *F21V 2200/40* (2015.01); *F21Y 2105/10* (2016.08); *F21Y 2113/13* (2016.08); *F21Y 2115/10* (2016.08)

(58) Field of Classification Search

CPC .......... F21V 5/008; F21V 5/003; F21V 5/007; F21V 5/043; F21V 5/048; F21V 2200/40; F21Y 2113/13; F21Y 2105/10; F21Y 2115/10

See application file for complete search history.

(56) References Cited

U.S. PATENT DOCUMENTS 5,594,752 A * 1/1997 Endriz ..................... B41J 2/451 372/50.23
2004/0247011 A1* 12/2004 Okazaki ............. G02B 19/0095 372/108
2007/0139926 A1* 6/2007 Anikitchev ........ G02B 27/0966 362/268
2016/0040854 A1* 2/2016 Zhang ....................... F21V 5/04 257/89
2016/0298827 A1* 10/2016 Jurik ......................... F21V 9/08

(Continued)

*Primary Examiner* — Zheng Song

(74) *Attorney, Agent, or Firm* — Conley Rose, P.C.; Brooks W Taylor; Matthew Gibson

(57) ABSTRACT

An LED light engine includes a plurality of LED emitters; a first lens array having a plurality of collimating lenslets corresponding to the plurality of LED emitters, where the first lens array is optically coupled to the plurality of LED emitters and configured to emit a plurality of light beams corresponding to the plurality of LED emitters, each of the light beams including partially collimated light rays; a light integrator optic to receive the plurality of light beams and to internally reflect the light beams to generate a plurality of at least partially-homogenized light beams; a homogenizer optically coupled to the light integrator optic and configured to receive the plurality of at least partially-homogenized light beams from the light integrator optic; and a converging lens optically coupled to the homogenizer. The homogenizer and the converging lens illuminate a gate with the plurality of light beams from the light integrator optic.

20 Claims, 4 Drawing Sheets

400

(56) References Cited

U.S. PATENT DOCUMENTS

| | | | | |
|---|---|---|---|---|
| 2019/0113184 | A1* | 4/2019 | Burgess | F21S 10/00 |
| 2021/0190291 | A1* | 6/2021 | Huang | F21V 5/008 |
| 2021/0262634 | A1* | 8/2021 | Lim | F21S 41/143 |
| 2025/0320981 | A1* | 10/2025 | Chen | G03B 21/208 |

* cited by examiner

LIGHT COLLECTION SYSTEM FOR AN LED ARRAY

CROSS-REFERENCE TO RELATED APPLICATIONS

Not applicable.

TECHNICAL FIELD OF THE DISCLOSURE

The present disclosure generally relates to automated luminaires, and more specifically to controlling light output from a light-emitting diode (LED) based light engine for use in an automated luminaire.

BACKGROUND

Luminaires with automated and remotely controllable functionality (referred to as automated luminaires) are known in the entertainment and architectural lighting markets. Such products are commonly used in theatres, television studios, concerts, theme parks, night clubs, and other venues. Many products provide control over parameters such as the intensity, color, focus, beam size, beam shape, and beam pattern and may also provide control over pan and tilt.

SUMMARY

In a first embodiment, an LED light engine includes a plurality of LED emitters; a first lens array having a first plurality of collimating lenslets corresponding to the plurality of LED emitters, where the first lens array is optically coupled to the plurality of LED emitters and configured to emit a plurality of light beams corresponding to the plurality of LED emitters, each of the light beams including partially collimated light rays; a light integrator optic to receive the plurality of light beams and to internally reflect the light beams to generate a plurality of at least partially-homogenized light beams; a homogenizer optically coupled to the light integrator optic and configured to receive the plurality of at least partially-homogenized light beams from the light integrator optic; and a converging lens optically coupled to the homogenizer. The homogenizer and the converging lens illuminate a gate with the plurality of light beams from the light integrator optic.

In a second embodiment, an automated luminaire includes an LED light engine, an optical system, and a controller. The LED light engine includes a plurality of LED emitters; a first lens array having a first plurality of collimating lenslets corresponding to the plurality of LED emitters, where the first lens array is optically coupled to the plurality of LED emitters and configured to emit a plurality of light beams corresponding to the plurality of LED emitters, each of the light beams including partially collimated light rays; a light integrator optic to receive the plurality of light beams and to internally reflect the light beams to generate a plurality of at least partially-homogenized light beams; a homogenizer optically coupled to the light integrator optic and configured to receive the plurality of at least partially-homogenized light beams from the light integrator optic; and a converging lens optically coupled to the homogenizer. The homogenizer and the converging lens illuminate a gate with the plurality of light beams from the light integrator optic.

In a third embodiments, an LED light engine includes a plurality of LED emitters; a first lens array having a first plurality of collimating lenslets corresponding to the plurality of LED emitters, where the first lens array is optically coupled to the plurality of LED emitters; a second lens array having a second plurality of collimating lenslets corresponding to the first plurality of collimating lenslets, where the second lens array is optically coupled to the first lens array, and where the first and second lens arrays are configured to emit a plurality of light beams corresponding to the plurality of LED emitters, each of the plurality of light beams including partially collimated light rays. The LED light engine also includes a light integrator optic configured to receive the plurality of light beams and to internally reflect the light beams to generate a plurality of at least partially-homogenized light beams. Sides of the light integrator optic are essentially parallel and an entry port of the light integrator optic is of a same size as an exit port of the light integrator optic. The LED light engine also includes a third lens array having a first plurality of converging lenslets optically coupled to the light integrator optic and configured to receive the plurality of at least partially-homogenized light beams from the light integrator optic; a fourth lens array having a second plurality of converging lenslets optically coupled to the second lens array; and a converging lens optically coupled to the fourth lens array. The third and fourth lens arrays and the converging lens are configured to illuminate a gate with the plurality of light beams received from the light integrator optic.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Figure 1:
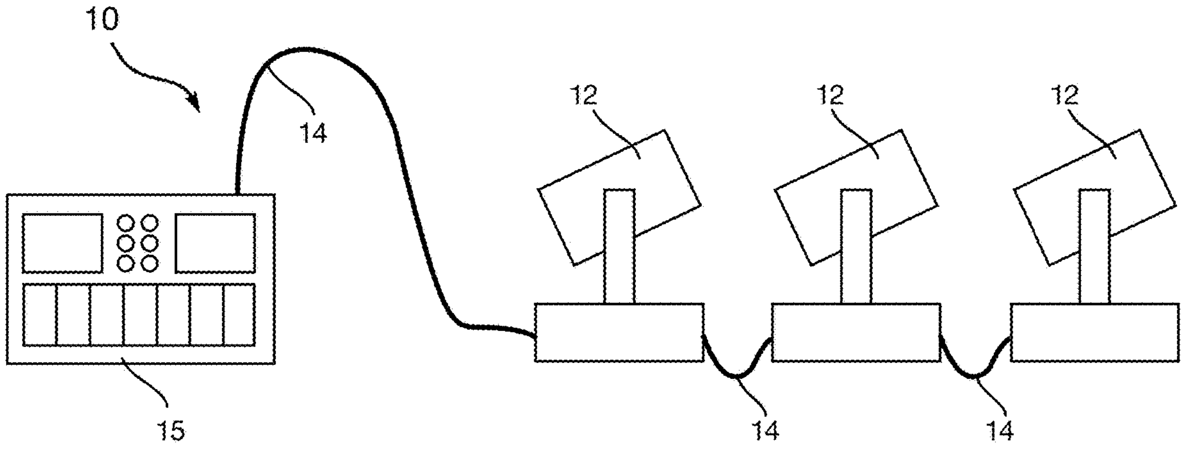
FIG. 1 presents a schematic view of a multiparameter automated luminaire system according to the disclosure.

Preferred embodiments are illustrated in the figures, like numerals being used to refer to like and corresponding parts of the various drawings.

It is becoming common to utilize high-power LEDs as the light source in automated luminaires, and using an array of LEDs of different colors (a multi-color LED array) allows for color control of the output beam of the automated luminaire. For example, a common configuration for a multi-color LED array is to use a mix of red, green, and blue LEDs. This configuration allows the user to create a desired color by mixing appropriate levels of the three colors. For example, illuminating red and green LEDs while leaving the blue LEDs extinguished will result in an output that appears yellow. Similarly, illuminating red and blue LEDs will result in magenta, while illuminating blue and green LEDs will result in cyan. More than three colors may also be used in the multi-color LED array. For example, it is known to add an amber, lime, or white LED to the red, green, and blue to enhance the color mixing and improve the gamut of colors available. By controlling the multi-color LED array, any color within the color gamut set by the LED colors in the array may be achieved.

The differently-colored LED dies may be arranged on packages in the luminaire such that there is physical separation between each color of LED. This separation, along with differences in die size for each color, may affect the spread of the individual colors and result in inadequate mixing of the different colors along with objectionable spill light and color fringing of the combined mixed color output beam. It is common to use a combination of lenses or other optical devices in front of the multi-color LED array to aid in focusing and mixing output light from each LED in the multi-color LED array. However, it may be desirable to include a greater number of differently-colored LEDs (e.g., more than red, green, and blue) in the multi-color LED array, which results in greater distance between same-color LEDs in the array. Accordingly, it may be challenging to adequately mix output light from each LED in a multi-color LED array, particularly when the LED array includes a greater number of differently-colored LEDs.

Embodiments of the present disclosure address the foregoing by providing an LED light engine in which a light integrator optic (e.g., a mixing tube) is combined with a homogenizer, such as fly-eye lens arrays, to facilitate mixing of light produced by a multi-color LED array. A light integrator optic having a greater aspect ratio between its length and its diameter provides greater mixing and homogenization of light entering the light integrator optic. Accordingly, although a light integrator optic alone may be capable of achieving a suitable level of mixing of light produced by the multi-color LED array, such a light integrator optic may be unacceptably long (e.g., resulting in an unacceptably large luminaire). Also, although multiple fly-eye lens arrays (or other types of homogenizers) alone may be capable of achieving a suitable level of mixing of light produced by the multi-color LED array, such an arrangement reduces the efficiency of the luminaire because each additional fly-eye lens array reduces light output of the luminaire.

Thus, the embodiments of the present disclosure combine the mixing properties of a light integrator optic with that of additional homogenizer(s), such as fly-eye lens arrays. Accordingly, the disclosed LED light engine is able to achieve a suitably homogeneous and well-mixed output beam even from an LED array with a greater number of colors, and/or a greater distance between same colored LEDs within the LED array. At the same time, the LED light engine provides improved efficiency relative to an LED light engine that uses only fly-eye lens array(s) (or other types of homogenizers) to achieve color mixing, and provides improved packaging relative to an LED light engine that uses only a light integrator optic to achieve color mixing. These and other embodiments are described further below, with reference made to the accompanying figures.

FIG. 1 presents a schematic view of a multiparameter automated luminaire system 10 according to the disclosure. The multiparameter automated luminaire system 10 includes a plurality of multiparameter automated luminaires 12 according to the disclosure. The automated luminaires 12 each contains on-board a light source, light modulation devices, and may include pan and/or tilt systems to control an orientation of a head of the automated luminaire 12. The on-board light source of each automated luminaire 12 may be a multi-color LED array, as described above. Mechanical drive systems to control parameters of the automated luminaire 12 include motors or other suitable actuators coupled to control electronics, as described in more detail with reference to FIG. 2. In addition to being connected to mains power either directly or through a power distribution system, each automated luminaire 12 is connected in series or in parallel via data link 14 to one or more control desks 15. An operator typically controls the parameters of the automated luminaires 12 via the control desk 15.

The automated luminaires 12 may include stepper motors to provide the movement for internal optical systems. Examples of such optical systems may include gobo wheels, effects wheels, and color mixing systems, as well as prism, iris, shutter, and lens movement.

Automated luminaires 12 may include an LED-based light source designed to collate and direct light through the optical systems installed in the automated luminaire 12. The assembly of the LED light sources along with associated collimating and directing optics may be referred to as a light engine. LED light engines may contain a single color of LED, such as white, or may contain a range of colors, each controllable individually so as to provide additive mixing of the LED outputs.

In the case of white light LED light engines, the light engine is often followed in the optical train by a color mixing section comprising a number of dichroic filters, which can be controlled so as to move across the light beam exiting from the light engine. By suitable choice of these filters and their accurate positioning, it is possible for the operator to produce a wide range of colors of the light beam. For example, using three sets of independent dichroic filters in cyan, magenta, and yellow allows the operator to mix a broad spectrum of colors, from blue through red, and also to adjust the saturation of those colors. However, systems with a white light LED engine typically have an optical path that is longer, and thus less efficient, because of the necessary inclusion of color mixing filters.

In the case of multi-color LED light engines, LEDs in a multi-color LED array are individually controlled to provide additive mixing of the LED outputs to achieve a wide range of colors of the light beam. As explained above, it may be desirable to include a greater number of differently-colored LEDs (e.g., more than red, green, and blue) in the multi-color LED array, which results in greater distance between same-color LEDs in the array. However, it may be difficult to adequately mix light produced by a multi-color LED array having a greater distance between same-color LEDs.

Disclosed herein is an improved LED light engine that incorporates a light integrator optic (e.g., a mixing tube) in addition to a homogenizer, such as fly-eye lens arrays, to facilitate mixing of light produced by a multi-color LED array. Among other benefits, an LED light engine according to the disclosure improves the quality—in particular the homogenization—of the color mixing, improves the efficiency of the luminaire, and reduces the size of the luminaire. For example, compared with a light engine that uses only a light integrator optic to achieve mixing of light from a multi-color LED array, the LED light engine according to this disclosure may be shorter in length (enabling a corresponding reduction in size of the luminaire), because a shorter light integrator optic can be used. As another example, compared with a light engine that uses only fly-eye lens arrays (or other types of homogenizers) to achieve mixing of light from a multi-color LED array, the LED light engine according to this disclosure may be more efficient, because each additional fly-eye lens array reduces light output of the luminaire.

Figure 2:
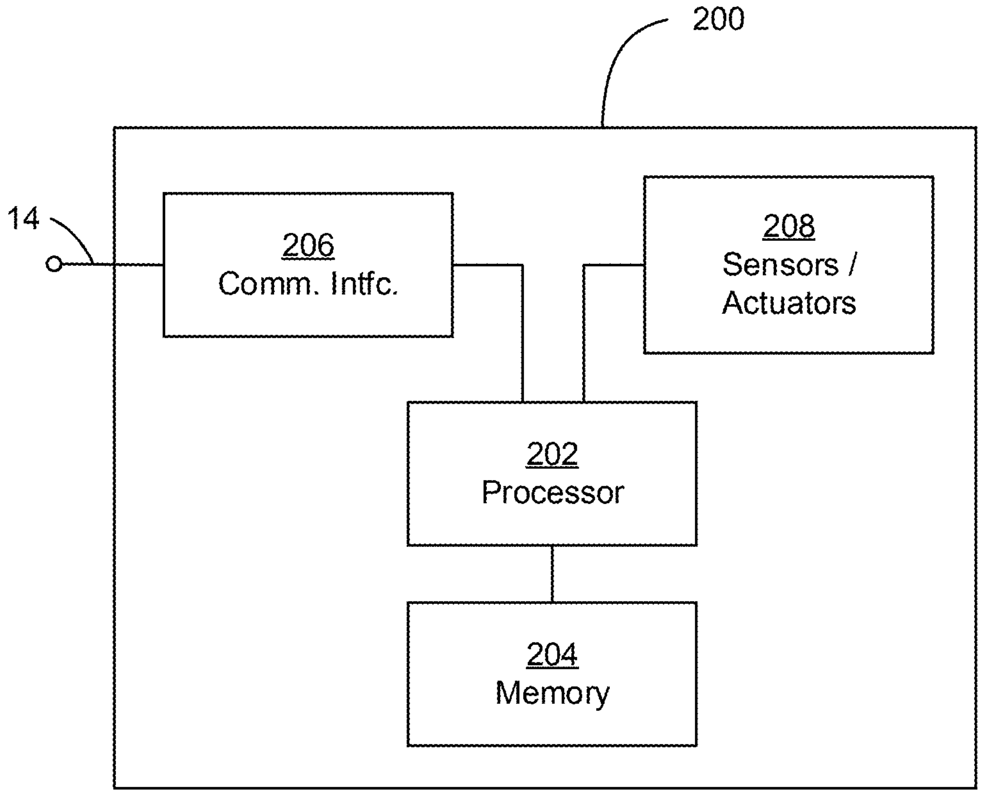
FIG. 2 presents a block diagram of a control system for an automated luminaire according to the disclosure.

FIG. 2 presents a block diagram of a control system (or controller) 200 for an automated luminaire 12 according to the disclosure. The control system 200 is suitable for use with the LED light engine of FIG. 3 or other systems according to the disclosure. The control system 200 is also suitable for controlling other control functions of the automated luminaire system 10. The control system 200 includes a processor 202 electrically coupled to a memory 204. The processor 202 is implemented by hardware and software. The processor 202 may be implemented as one or more central processing unit (CPU) chips, cores (e.g., as a multi-core processor), field-programmable gate arrays (FPGAs), application-specific integrated circuits (ASICs), and digital signal processors (DSPs).

The processor 202 is further electrically coupled to and in communication with a communication interface 206. The communication interface 206 is coupled to, and configured to communicate via, the data link 14. The processor 202 is also coupled via a control interface 208 to one or more sensors, motors, actuators, controls and/or other devices. The processor 202 is configured to receive control signals from the data link 14 via the communication interface 206 and, in response, to control the LED light engine and other mechanisms of the automated luminaire system 10 via the control interface 208.

The control system 200 is suitable for implementing processes, including controlling LED brightness and color selection, and other functionality as disclosed herein, which may be implemented as instructions stored in the memory 204 and executed by the processor 202. The memory 204 comprises one or more disks and/or solid-state drives and may be used to store instructions and data that are read and written during program execution. The memory 204 may be volatile and/or non-volatile and may be read-only memory (ROM), random access memory (RAM), ternary content-addressable memory (TCAM), and/or static random-access memory (SRAM).

Figure 3:
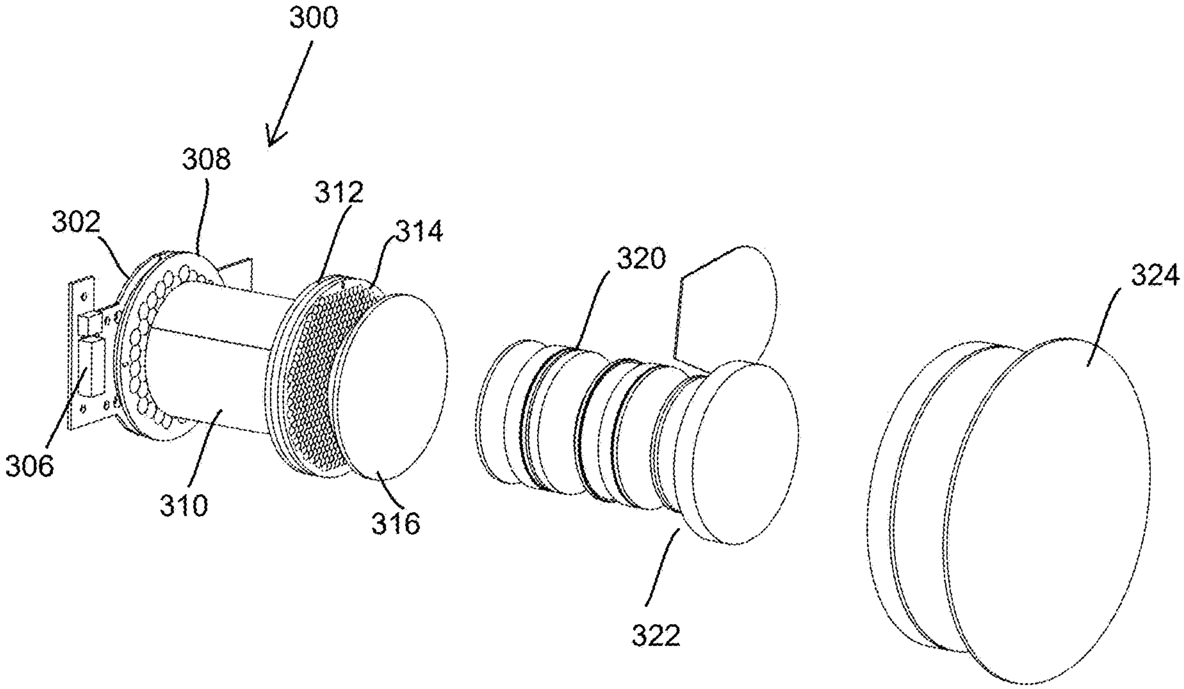
FIG. 3 presents an exploded orthogonal view of an LED light engine according to the disclosure.
Figure 4:
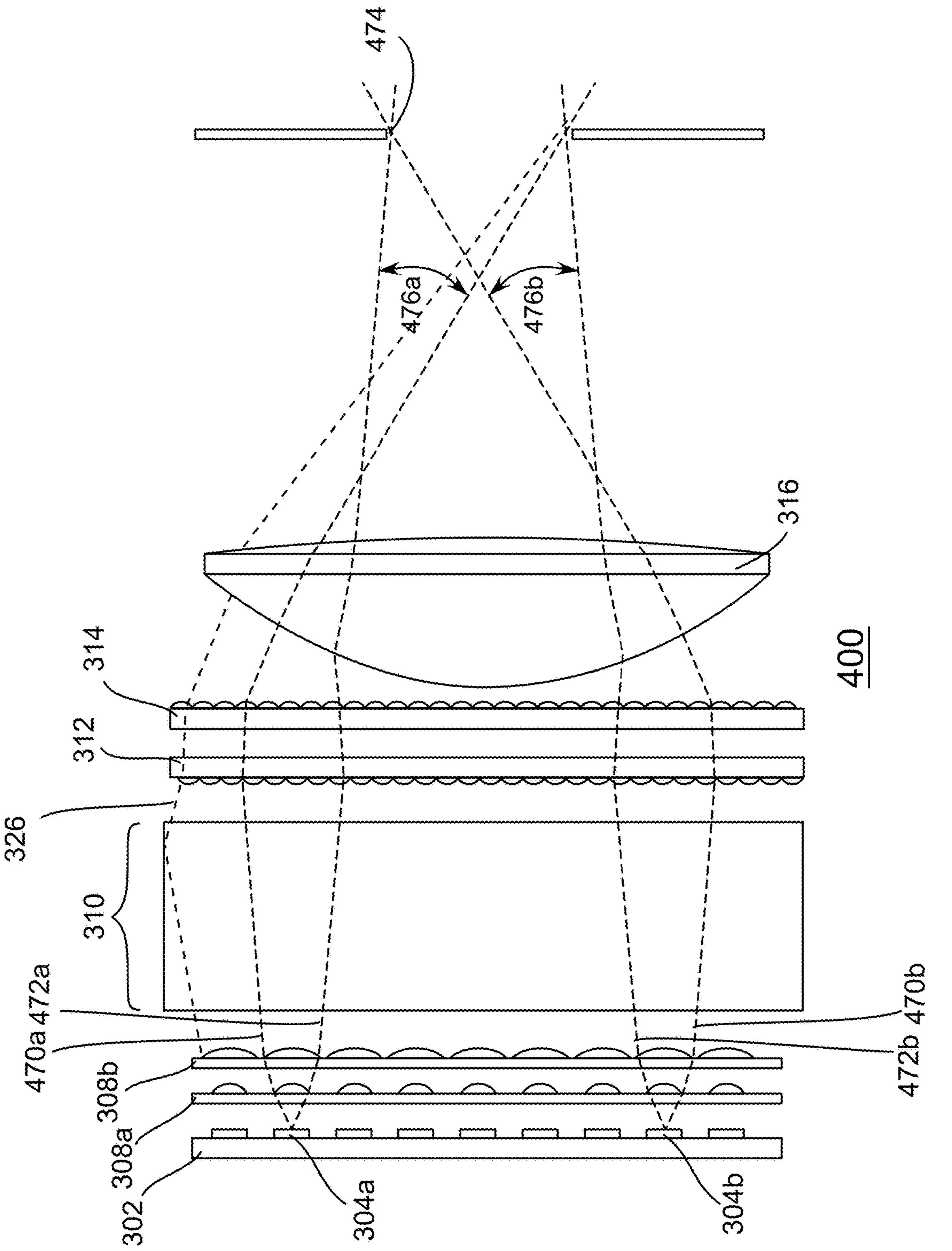
FIG. 4 shows a representational schematic side view of the LED light engine of FIG. 3, illustrating exemplary light paths.

FIG. 3 presents an exploded orthogonal view of an LED light engine 300 according to the disclosure. A substrate 302 (e.g., a circuit board) includes array of a plurality of LED emitters 304 mounted thereon, as shown in FIG. 4. The substrate 302 also includes electrical connector 306 through which the LED emitters 304 can be powered and controlled. As described above, the LED emitters 304 may be in a plurality of colors. Regardless of the color of the LED emitters 304, the individual LED emitters 304 may be configured to be controllable as a single group, in multiple groups, or individually depending on the requirements of the luminaire. Each LED emitter 304 may have a primary optic comprising a reflector, total internal reflection (TIR) lens, or other suitable optic.

LED emitters 304 may be simple LEDs or may comprise an LED emitter coupled with a phosphor. In further embodiments LED emitters 304 may comprise laser diodes with or without an associated phosphor.

Each LED emitter 304 is associated with one or more collimating lenslets on corresponding one or more collimating lens arrays 308. The collimating lens array(s) 308 may be referred to as condenser(s) 308 for brevity. Each LED emitter 304 is optically coupled to and optically aligned with its corresponding collimating lenslet on condenser 308. In examples in which first and second condensers **308*a*, 308*b* are present, such as that shown in FIG. 4, each collimating lenslet on the first condenser 308*a* is optically coupled to and optically aligned with its corresponding collimating lenslet on the second condenser 308*b*. That is, light from each LED emitter 304 passes first through its corresponding collimating lenslet on a first condenser 308*a*, and then through its corresponding collimating lenslet on a second condenser 308*b*** (if present).

Light rays of the resulting light beam from each LED emitter 304 and its collimating lenslets are partially collimated. In some embodiments the term "partially collimated" means that the half cone angle of the light beam exiting the second collimating lenslet on condenser **308*b* is 10° (10 degrees). In other embodiments, "partially collimated" means that this half cone angle may be as low as 5° or as high as 20°. In an example, LED emitters 304, substrate 302, condenser 308*a* and condenser 308*b* may be assembled with electrical connector 306 so as to form a unitary LED module. In the embodiment disclosed and described, the LED emitters 304** comprise a multi-color LED array.

Although condensers **308*a* and 308*b* are shown on two separate substrates, in other embodiments, condensers 308*a* and 308*b* may be fabricated on opposite sides of a single (common) substrate. Condensers 308*a* and 308*b* and their substrate(s) according to the disclosure may be molded from a material comprising glass or a transparent polymer. In still other embodiments, condensers 308*a* and 308*b* may be fabricated from multiple individual collimating lenslets. In yet other embodiments, condensers 308*a* and 308*b* may be replaced with a single lens array fabricated from glass or other optical material having a higher refractive index than condensers 308*a* and 308*b*** or comprising collimating lenslets having an aspherical profile.

In the embodiment shown in FIG. 3, the partially collimated light beams emitted by the condenser(s) 308 then pass to a light integrator optic 310. In particular, the partially collimated light beams emitted by the condenser(s) 308 pass to the light integrator optic 310 at an entry port thereof.

The light integrator optic 310 is a device utilizing internal reflection so as to collect, homogenize and constrain, and conduct the light from condenser(s) 308. The light integrator optic 310 may be a hollow tube with a reflective inner surface such that light impinging into the entry port may be reflected multiple times along the tube before leaving at an exit port of the light integrator optic 310. The light integrator optic 310 may be a square tube, a hexagonal tube, a heptagonal tube, an octagonal tube, a circular tube, or a tube of any other cross section. In a further embodiment, the light integrator optic 310 may be a solid rod constructed of glass, transparent plastic, or other optically transparent material where the reflection of the incident light beam within the rod is due to total internal reflection (TIR) from the interface between the material of the rod and the surrounding air. The integrating rod may be a square rod, a hexagonal rod, a heptagonal rod, an octagonal rod, a circular rod, or a rod of any other cross section. Regardless of whether the light integrator optic 310 is a hollow tube or a solid rod, the light integrator optic 310 may have a cross section that is circular in some embodiments, and polygonal in other embodiments. Embodiments of light integrator optic 310 according to this disclosure with a polygonal cross section have reflective sides and corners between the reflective sides.

In a yet further embodiment, the light integrator optic 310 may have a straight sided square cross section at the entry port and a straight sided polygonal cross section with more than four sides at the exit port. The exit port may be pentagonal, hexagonal, heptagonal, octagonal, or have any other integral number of sides.

A feature of a light integrator optic 310, which comprises a hollow or tube or solid rod where the sides of the rod or tube are essentially parallel and the entry port and exit port are of the same size, is the divergence angle of light exiting the light integrator optic 310 at exit port will be the same as the divergence angle for light entering the light integrator optic 310 at entry port. Thus, a parallel-sided light integrator optic 310 has no effect on the beam divergence and will transfer the position of the focal point of condenser(s) 308 at their output to the light integrator optic's 310 exit port.

In some examples, the light integrator optic 310 has an aspect ratio in which its length is greater than its diameter. The greater the ratio between length and diameter, the better the resultant mixing and homogenization will be. The light integrator optic 310 may be enclosed in a tube or protective sleeve that provides mechanical protection against damage, scratches, and dust.

Regardless of the particular configuration of the light integrator optic 310, the light exiting the light integrator optic 310 will be generally well-homogenized, with the colors of LEDs 304 beginning to be mixed together. However, as described above, because of the greater distance between same-color LEDs in the array of LEDs 304, achieving a suitably homogenous and mixed output beam from only the light integrator optic 310 may require the light integrator optic 310 to have a length that is greater than desired. For example, if an automated luminaire 12 uses only the light integrator optic 310 to achieve color mixing of the LEDs 304, the required length of the light integrator optic 310 may create packaging difficulties and/or result in an unacceptably-long light engine 300.

To address the foregoing while still achieving a suitably homogeneous and well mixed output beam, the output of the light integrator optic 310 is provided to a homogenizer, which is represented in FIG. 3 by fly-eye lens array 312 and fly-eye lens array 314. The fly-eye lens arrays 312 and 314 may be referred to as homogenizing or integration lens arrays. Each of the fly-eye lens arrays 312 and 314 comprise a plurality of converging lenslets.

The fly-eye lens arrays 312 and 314 are configured, along with converging lens 316, such that the beam originating from each individual LED emitter 304 illuminates a gate (or stop) of the automated luminaire (as described with reference to FIG. 4). In a projection optical system according to the disclosure, the gate is an imaging area or region of through which the beams from the LED emitters 304 pass in order to illuminate an iris, gobo, or other image-generating optical device. In a wash optical system according to the disclosure, a gate is a region of the optical system where the beams from the LED emitters 304 overlap before passing through further optical devices to be formed into an even, soft-edged beam. A gate may be a physical (e.g., an aperture as shown in FIG. 4) or may be 'virtual' (e.g., a narrow region in the optical system where the beams from the LED emitters 304 overlap).

The fly-eye lens arrays 312 and 314 and the converging lens 316 are configured to overlap the light beams from each LED emitter 304 onto the gate area, providing full integration of brightness variations and homogenization of colors, thus producing a light beam with a smooth illumination and single color at the gate. Fly-eye lens array 312, fly-eye lens array 314, and converging lens 316 may be assembled with mounting plates to form a unitary integration module.

Although fly-eye lens arrays 312 and 314 are shown as constructed on two separate substrates, in other embodiments, fly-eye lens arrays 312 and 314 may be on opposite sides of a single substrate. Fly-eye lens arrays and their substrate(s) according to the disclosure may be molded from a material comprising glass or a transparent polymer. In still other embodiments, fly-eye lens arrays may be fabricated from multiple individual converging lenslets. In fly-eye lens arrays 312 and 314, the converging lenslets a but each other, leaving no substrate exposed between converging lenslets. In other embodiments, substrate may be exposed between some or all of the converging lenslets.

Although FIG. 3 specifically illustrates fly-eye lens arrays 312 and 314, in other embodiments, the homogenizer may include a frost filter, a holographic diffuser, or other diffuser optics that implement a homogenizing effect on a light beam passing therethrough. Regardless of the particular type of homogenizer used in the LED light engine 300, the homogenizer is optically coupled to the light integrator optic 310 and is configured to receive partially-homogenized light beams therefrom. The homogenizer provides its output to the converging lens 316.

The light exiting the converging lens 316 will be well-homogenized with all the colors of LEDs 304 mixed together into a single colored light beam and may be used as an output of an automated luminaire 12, or may be further modified by downstream optical systems. For example, the light exiting the converging lens 316 may be provided to one or more of a focus lens group 320, a zoom lens group 322, and an output lens group 324.

Thus, the embodiments of the present disclosure combine the mixing properties of the light integrator optic 310 with the fly-eye lens arrays 312 and 314 (or another type of homogenizer). Accordingly, the light engine 300 is able to achieve a suitably homogeneous and well-mixed output beam even from an LED array 304 with a greater number of colors, and/or a greater distance between same colored LEDs within the LED array 304. At the same time, the light engine 300 provides improved efficiency relative to a light engine that uses only fly-eye lens array(s) to achieve color mixing, and provides improved packaging relative to a light engine that uses only a light integrator optic to achieve color mixing.

FIG. 4 shows a schematic side view 400 of the LED light engine 300 of FIG. 3, illustrating exemplary light paths. LED emitter 304*a* emits a light beam 326, which illustrates an example of rays being reflected from the light integrator optic 310. As shown in FIG. 4, the light integrator optic 310 is thus able to effectively reduce the size of the LED light engine 300 (e.g., a diameter of the LED light engine 300 relative to a similarly-configured light engine but without the light integrator optic 310) and increase the efficiency thereof.

LED emitter 304*a* also emits a light beam 476*a* bounded by light rays 470*a* and 472*a*. LED emitter 304*b* emits a light beam 476*b* bounded by light rays 470*b* and 472*b*. The light beam 476*a* from LED emitter 404*a* is collimated by a collimating lenslet in the lens array 308*a* and a collimating lenslet in the lens array 308*b*, so as to provide a partially collimated beam as it passes through the light integrator optic 310. The now at least partially-mixed beam 476*a* is then further integrated and homogenized by fly-eye lens array 312 and fly-eye lens array 314 before passing through converging lens 316 and being directed through an aperture gate 474 of the luminaire. Light beam 476*b* follows a similar path through the LED light engine 300.

While a single pair of collimating lenslets in lens arrays 308*a* and 308*b* are optically coupled to each of the light beams 476*a* and 476*b*, the lenslets in the fly-eye lens arrays 312 and 314 are smaller, such that each of the light beams 476*a* and 476*b* pass through a plurality of adjacent converging lenslets, which collectively operate to further homogenize and integrate the at least partially-mixed beams emerging from the light integrator optic 310.

The light beams 476*a* and 476*b* overlap at the gate 474. That is, the LED light engine 300 directs the light beams from each of the LED emitters 304 to cover the entire gate

474. As a result, the light beams from the LED emitters 304 overlap at gate 474 and the resultant combined light beam is well mixed and homogenized, combining the light from all LED emitters 304 and all the variations of color (after passing through the combination of the light integrator optic 310 and the fly-lens arrays 312 and 314) into a single colored light beam.

While only some embodiments of the disclosure have been described herein, those skilled in the art, having benefit of this disclosure, will appreciate that other embodiments may be devised which do not depart from the scope of the disclosure. While the disclosure has been described in detail, it should be understood that various changes, substitutions and alterations can be made hereto without departing from the spirit and scope of the disclosure.

What is claimed is:

1. A light-emitting diode (LED) light engine, comprising:
a plurality of LED emitters;
a first lens array comprising a first plurality of collimating lenslets, wherein each lenslet corresponds to only one of the plurality of LED emitters, and wherein the first lens array is optically coupled to the plurality of LED emitters and configured to emit a plurality of light beams corresponding to the plurality of LED emitters, each of the plurality of light beams comprising partially collimated light rays;
a light integrator optic configured to receive the plurality of light beams and to internally reflect the light beams to generate a plurality of at least partially-homogenized light beams;
a homogenizer optically coupled to the light integrator optic and configured to receive the plurality of at least partially-homogenized light beams from the light integrator optic; and
a converging lens optically coupled to the homogenizer, wherein the homogenizer and the converging lens are configured to illuminate a gate with the plurality of light beams received from the light integrator optic.

2. The LED light engine of claim 1, wherein the homogenizer comprises:
a second lens array comprising a first plurality of converging lenslets that are optically coupled to the light integrator optic and configured to receive the plurality of at least partially-homogenized light beams from the light integrator optic; and
a third lens array comprising a second plurality of converging lenslets optically coupled to the second lens array,
wherein the converging lens is optically coupled to the third lens array.

3. The LED light engine of claim 2, further comprising:
a fourth lens array comprising a second plurality of collimating lenslets corresponding to the first plurality of collimating lenslets,
wherein the fourth lens array is optically coupled to the first lens array, and
wherein the first and fourth lens arrays are configured to emit the plurality of light beams corresponding to the plurality of LED emitters.

4. The LED light engine of claim 3, wherein:
each collimating lenslet of the first plurality of collimating lenslets is optically aligned with a corresponding one of the plurality of LED emitters; and
each collimating lenslet of the second plurality of collimating lenslets is optically aligned with a corresponding one of the first plurality of collimating lenslets.

5. The LED light engine of claim 3, wherein the first and fourth lens arrays are fabricated on opposite sides of a common substrate.

6. The LED light engine of claim 3, wherein the second and third lens arrays are fabricated on opposite sides of a common substrate.

7. The LED light engine of claim 3, wherein the plurality of LED emitters, the first lens array, the fourth lens array, and the light integrator optic are mechanically coupled to form an LED module.

8. The LED light engine of claim 1, wherein the plurality of LED emitters comprise a multi-color LED array.

9. The LED light engine of claim 1, wherein the homogenizer comprises a frost filter or a holographic diffuser.

10. The LED light engine of claim 1, wherein the light integrator optic is a solid optic configured to use total internal reflection (TIR) to internally reflect the light.

11. The LED light engine of claim 1, wherein the light integrator optic is a hollow tube with a reflective inner surface.

12. The LED light engine of claim 1, wherein a cross-section of the light integrator optic is circular.

13. The LED light engine of claim 1, wherein a cross-section of the light integrator optic is polygonal.

14. The LED light engine of claim 1, wherein sides of the light integrator optic are essentially parallel and an entry port of the light integrator optic is of a same size as an exit port of the light integrator optic.

15. An automated luminaire, comprising:
an LED light engine;
an optical system optically coupled to the LED light engine; and
a controller electrically coupled to the LED light engine and to a data link and configured to control physical and electrical functions of the LED light engine in response to control signals received via the data link,
wherein the LED light engine comprises:
a plurality of LED emitters;
a first lens array comprising a first plurality of collimating lenslets, wherein each lenslet corresponds to only one of the plurality of LED emitters, wherein the first lens array is optically coupled to the plurality of LED emitters and configured to emit a plurality of light beams corresponding to the plurality of LED emitters, each of the plurality of light beams comprising partially collimated light rays;
a light integrator optic configured to receive the plurality of light beams and to internally reflect the light beams to generate a plurality of at least partially-homogenized light beams;
a homogenizer optically coupled to the light integrator optic and configured to receive the plurality of at least partially-homogenized light beams from the light integrator optic; and
a converging lens optically coupled to the homogenizer, wherein the homogenizer and the converging lens are configured to illuminate a gate with the plurality of light beams received from the light integrator optic.

16. The automated luminaire of claim 15, wherein the homogenizer comprises:
a second lens array comprising a first plurality of converging lenslets that are optically coupled to the light integrator optic and configured to receive the plurality of at least partially-homogenized light beams from the light integrator optic; and a third lens array comprising a second plurality of converging lenslets optically coupled to the second lens array, wherein the converging lens is optically coupled to the third lens array.

17. The automated luminaire of claim 16, further comprising:

a fourth lens array comprising a second plurality of collimating lenslets corresponding to the first plurality of collimating lenslets, wherein the fourth lens array is optically coupled to the first lens array, and wherein the first and fourth lens arrays are configured to emit the plurality of light beams corresponding to the plurality of LED emitters.

18. The automated luminaire of claim 15, wherein the homogenizer comprises a frost filter or a holographic diffuser.

19. The automated luminaire of claim 15, wherein sides of the light integrator optic are essentially parallel and an entry port of the light integrator optic is of a same size as an exit port of the light integrator optic.

20. A light-emitting diode (LED) light engine, comprising:

a plurality of LED emitters;

a first lens array comprising a first plurality of collimating lenslets corresponding to the plurality of LED emitters, wherein the first lens array is optically coupled to the plurality of LED emitters;

a second lens array comprising a second plurality of collimating lenslets corresponding to the first plurality of collimating lenslets, wherein the second lens array is optically coupled to the first lens array, and wherein the first and second lens arrays are configured to emit a plurality of light beams corresponding to the plurality of LED emitters, each of the plurality of light beams comprising partially collimated light rays;

a light integrator optic configured to receive the plurality of light beams and to internally reflect the light beams to generate a plurality of at least partially-homogenized light beams, wherein sides of the light integrator optic are essentially parallel and an entry port of the light integrator optic is of a same size as an exit port of the light integrator optic;

a third lens array comprising a first plurality of converging lenslets optically coupled to the light integrator optic and configured to receive the plurality of at least partially-homogenized light beams from the light integrator optic;

a fourth lens array comprising a second plurality of converging lenslets optically coupled to the second lens array; and a converging lens optically coupled to the fourth lens array, wherein the third and fourth lens arrays and the converging lens are configured to illuminate a gate with the plurality of light beams received from the light integrator optic.

* * * * *